No. 884,983. PATENTED APR. 14, 1908.
L. J. LINDSAY.
NUT LOCK.
APPLICATION FILED JAN. 14, 1907.
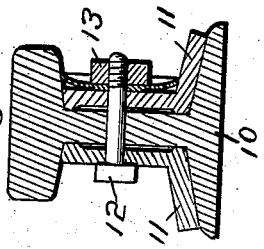
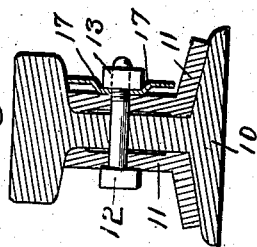
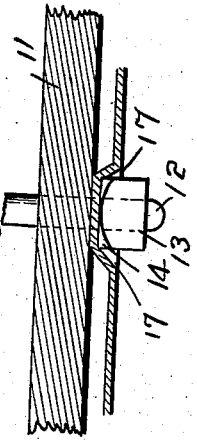
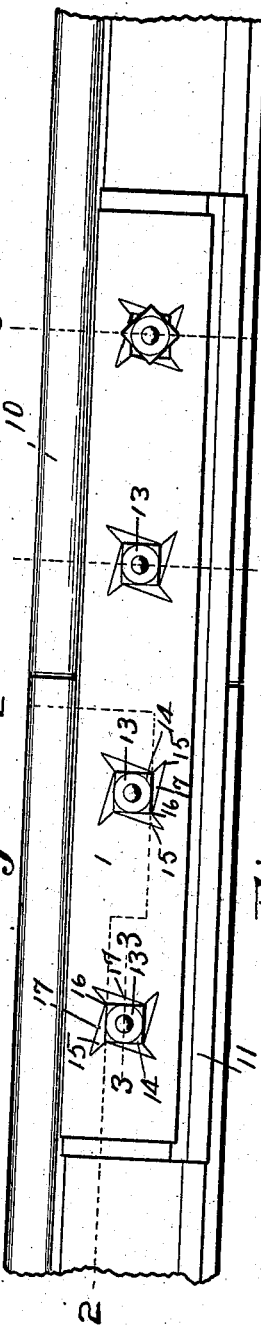
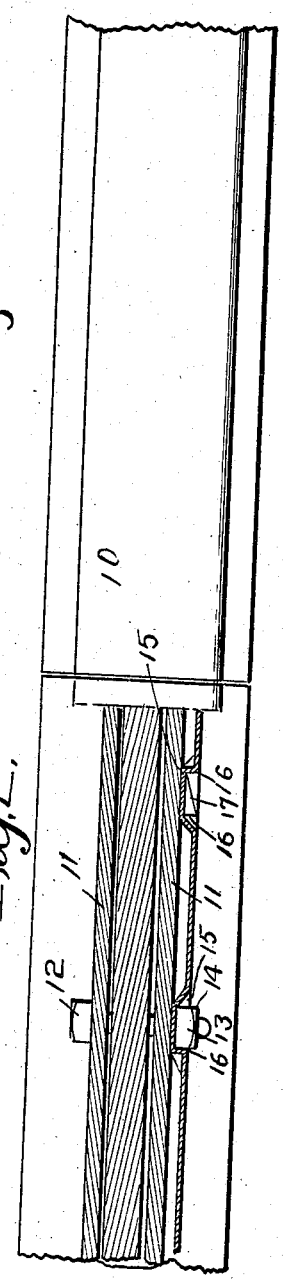
Witnesses
A. G. Hague
J. B. Smutney
Inventor
L. J. Lindsay
by Orwig & Lane Attys

UNITED STATES PATENT OFFICE.

LEROY J. LINDSAY, OF SEYMOUR, IOWA, ASSIGNOR OF ONE-THIRD TO JAMES T. PHILLIPS AND ONE-THIRD TO JOHN C. PHILLIPS, OF SEYMOUR, IOWA.

NUT-LOCK.

No. 884,983.　　　Specification of Letters Patent.　　　Patented April 14, 1908.

Application filed January 14, 1907. Serial No. 352,206.

*To all whom it may concern:*

Be it known that I, LEROY J. LINDSAY, a citizen of the United States, residing at Seymour, in the county of Wayne and State of Iowa, have invented a certain new and useful Nut-Lock, of which the following is a specification.

The object of my invention is to provide a nut lock of simple, durable and inexpensive construction in which an ordinary bolt and nut are used and the nut may be turned by a wrench in a direction tending to screw it on the bolt and the nut may be turned to position where the nut seat of the nut locking washer is firmly held against the objects being clamped, together by the bolt, and nut, and when in this position, the nut will be positively locked against unscrewing movements.

A further object is to provide a nut locking washer so arranged that when used in connection with a nut having a rounded face and said rounded face is placed adjacent to the nut locking washer, the nut will be yieldingly held against unscrewing movements, but may be forced by a wrench in such a manner as to be unscrewed from the bolt.

My invention consists in the construction of the nut locking washer and the arrangement and combination thereof with a bolt and nut, whereby the objects contemplated are attained, as hereinafter more fully set forth, pointed out in my claims and illustrated in the accompanying drawings, in which—

Figure 1 shows a side elevation of two abutting railway rail sections clamped together, by means of fish-plates, bolts and nuts and my improved nut locking washer.
Fig. 2 shows a plan view of same with a portion thereof in horizontal section on the line 2—2 of Fig. 1. Fig. 3 shows an enlarged detail sectional view on the line 3—3, of Fig. 1. Fig. 4 shows a transverse, sectional view on the line 4—4 of Fig. 1. The nut and bolt are not shown in section, and Fig. 5 shows a transverse, sectional view through the line 5—5 of Fig. 1.

Referring to the accompanying drawings, I have used the reference numeral 10 to indicate the railway rail and 11 the fish-plates thereon. These are simply shown to illustrate one method of using my improved nut lock. The reference numeral 12 indicates a bolt of the ordinary kind and 13 a nut of the ordinary kind. One face of each nut is flat and the other has its corners rounded at 14 in the usual manner.

My improved nut locking washer is formed complete of a single piece of resilient sheet metal. In the accompanying illustrations, I have shown the nut locking washer of the size and shape to receive four bolts and nuts and to rest against the face of a railway fishplate. However, the outline of the nut locking washer may vary as the requirements demand and may be adapted to receive one or more bolts and nuts. At the point where the bolt is to extend through the washer, there is a bolt opening and surrounding this bolt opening the metal is made flat to exactly fit the flat face of a nut on the bolt. Assuming the nut to be a four-sided one, as shown in the illustration, the nut bearing face comprises a rectangular figure the size of a nut. The material of the nut locking washer is pressed outwardly from each edge of the nut bearing face so that only that portion of the washer behind the nut bearing face engages the articles being clamped together by the nut and bolt. The material of the nut locking washer adjacent to each edge of the nut bearing face thereof is inclined as follows: At one end of said nut bearing face, the material inclines outwardly and away from the nut bearing face at a comparatively slight degree of inclination, as shown at 15 to the left of Fig. 1, and at the opposite side of said edge of the nut bearing face, the material of the nut locking washer is substantially at right angles to the nut bearing face as shown at 16 in Figs. 1 and 2. The surface between the points 15 and 16 is indicated by the reference numeral 17 and is beveled from the part 16 to the part 15, the outer portion of said parts 17 being flush with the outer face of the nut locking washer and the inner portion of said parts 17 being flush with the nut bearing face of the washer. The part 15 is arranged at that corner of the nut bearing face where the corner of a nut would strike first when being turned in a direction for screwing it on the bolt.

In practical use and assuming that the flat face of a nut is placed adjacent to the nut locking washer, then when screwing the nut to position, its corners will first strike upon the parts 15 of the beveled faces surrounding the nut bearing face and the corners of the nut will force the material of the nut locking washer inwardly toward the parts being clamped together, thus temporarily flattening out the nut locking washer, as shown in Fig. 5. As soon as the nut is turned so that its sides coincide with the nut bearing face of the washer, then the beveled faces surrounding the nut bearing face again spring outwardly to their normal positions. This successive flattening out of the material surrounding the nut bearing face of the washer continues until the parts are firmly clamped together by the nut and bolt and the nut is securely seated upon the nut bearing face. Obviously when in this position the parts being clamped together will be firmly and immovably held and obviously the nut cannot be unscrewed, because in order to do so, it would have to be turned in a reverse direction and this would bring the square edges of the nut face into contact with the parts 16 of the beveled portions surrounding the nut bearing face which right angled shoulders 16 would prevent an unscrewing movement of the nut. In some instances, it is desirable to provide a nut locking device that does not form a positive lock and yet will aid in holding the nut against ordinary unscrewing movement. When this kind of a nut lock is desired, I simply place the nut on the bolt with the side of the nut that has the rounded corners adjacent to the nut locking washer. These rounded corners will permit the nut to be unscrewed because they will, when turned in a reversed direction, start to move over the square shoulders 16 and thus flatten out the material of the nut locking washers and permit an unscrewing movement, although they will not unscrew, unless considerable power is applied thereto in the proper direction.

Having thus described my invention, what I claim and desire to secure by Letters Patent of the United States, therefor is—

An improved nut locking washer comprising a flat body portion, a flat nut bearing face offset from the body portion and of a size and shape to conform to the nut being used, and capable of having a nut seated wholly against said face, the material between the flat body portion and the flat face being formed of beveled portions having a minimum degree of inclination at one end and a substantially right angled shoulder at the other end, one of said beveled portions being arranged at each side of the nut bearing face, the entire washer being formed of a single piece of resilient sheet metal, the beveled portions thereof being capable of yielding and flattening out when engaged by the corners of a nut, and also capable of returning to normal position when the nut rests upon the nut bearing face, the said nut bearing face also being provided with a bolt opening at its center, and the entire washer being uncut except at said bolt opening.

Des Moines, Iowa, November 30, 1906.

LEROY J. LINDSAY.

Witnesses:
T. P. RALPH,
W. F. WHARTON.